(12) United States Patent
Meyer (10) Patent No.: US 9,574,355 B2
(45) Date of Patent: Feb. 21, 2017

(54) TILE WITH MAGNETIC TYPE MATERIAL AND COVERED WITH A LAYER OF PARCHMENT AND PROCESS THEREOF

(71) Applicant: Jesse Karl Meyer, Beacon, NY (US)

(72) Inventor: Jesse Karl Meyer, Beacon, NY (US)

( * ) Notice: Subject to any disclaimer, the term of this patent is extended or adjusted under 35 U.S.C. 154(b) by 506 days.

(21) Appl. No.: 14/169,152

(22) Filed: Jan. 31, 2014

(65) Prior Publication Data

US 2014/0220271 A1   Aug. 7, 2014

Related U.S. Application Data

(60) Provisional application No. 61/762,291, filed on Feb. 7, 2013.

(51) Int. Cl.
| | | |
|---|---|---|
| *E04F 15/10* | (2006.01) | |
| *A63H 33/04* | (2006.01) | |
| *A63H 33/00* | (2006.01) | |
| *E04F 13/30* | (2006.01) | |
| *A47G 1/00* | (2006.01) | |
| *A63H 33/26* | (2006.01) | |
| *B42D 1/00* | (2006.01) | |

(Continued)

(52) U.S. Cl.
CPC .............. *E04F 15/107* (2013.01); *A47G 1/00* (2013.01); *A63H 33/00* (2013.01); *A63H 33/04* (2013.01); *A63H 33/046* (2013.01); *A63H 33/26* (2013.01); *B42D 1/00* (2013.01); *E04F 13/0883* (2013.01); *E04F 13/30* (2013.01); *E04F 15/02144* (2013.01); *E04F 15/10* (2013.01); *E04F 15/102* (2013.01); *E04F 15/105* (2013.01); *G09F 1/00* (2013.01); *E04F 2201/06* (2013.01); *E04F 2203/02* (2013.01); *E04F 2203/023* (2013.01); *E04F 2203/026* (2013.01); *Y10T 428/1307* (2015.01); *Y10T 428/1334* (2015.01)

(58) Field of Classification Search
CPC ...... E04F 2203/023; E04F 13/30; E04F 15/10; E04F 15/105; E04F 15/102; E04F 2203/02; E04F 2201/06; E04F 2203/026; A63H 33/26; A63H 33/00; A63H 33/046; A63H 33/04; A47G 1/00; B42D 1/00; G09F 1/00; Y10T 428/1334; Y10T 428/1307
See application file for complete search history.

(56) References Cited

U.S. PATENT DOCUMENTS

| | | |
|---|---|---|
| 4,143,472 A | 3/1979 | Murata et al. |
| 4,288,936 A | 9/1981 | Okutsu |
| (Continued) | | |

*Primary Examiner* — Walter B Aughenbaugh (74) *Attorney, Agent, or Firm* — Aziz M. Ahsan; Ahsan & Associates, PLLC (57) ABSTRACT

The present invention relates generally to a tile or panel having at least one magnetic material embedded therein, and fully or partially covered with at least one layer of parchment. The invention also encompasses at least one discrete permanent magnet that is placed at an appropriate location within a panel or tile, and wherein at least a portion of the panel or tile and the at least one magnet are then optionally covered with at least one layer of at least one barrier material, and then at least one parchment layer partially or fully envelopes this assembly. The inventive tile having at least one magnetic type material can have at least one indicia or design on at least one surface, and the inventive tile can be magnetically attached to a wall or another panel having at least one magnetic type material to form a wall or panel surface.

21 Claims, 3 Drawing Sheets

(51) Int. Cl.
*G09F 1/00* (2006.01)
*E04F 13/08* (2006.01)
*E04F 15/02* (2006.01)

(56) References Cited

U.S. PATENT DOCUMENTS

| | | | |
|---|---|---|---|
| 4,536,428 A | 8/1985 | Murata et al. | |
| 4,910,459 A | 3/1990 | Odagawa et al. | |
| 5,184,395 A | 2/1993 | Pan et al. | |
| 5,347,733 A | 9/1994 | Whittington | |
| 5,916,662 A * | 6/1999 | Schmidt | B44C 5/0446 |
| | | | 428/141 |
| 6,587,022 B1 | 7/2003 | Devine | |
| 6,629,847 B1 | 10/2003 | Satoh | |
| 7,015,892 B1 | 3/2006 | Nihira et al. | |
| 7,830,590 B2 | 11/2010 | Misawa et al. | |
| 7,843,295 B2 | 11/2010 | Fullerton et al. | |
| 7,896,309 B1 | 3/2011 | DiGiammo | |
| 2003/0005613 A1 | 1/2003 | Gleekel et al. | |
| 2005/0237138 A1 | 10/2005 | Reymann | |
| 2012/0000156 A1* | 1/2012 | Esposito | E04F 15/02 |
| | | | 52/309.13 |
| 2012/0038082 A1* | 2/2012 | Burger | B29C 45/14262 |
| | | | 264/259 |

\* cited by examiner

TILE WITH MAGNETIC TYPE MATERIAL AND COVERED WITH A LAYER OF PARCHMENT AND PROCESS THEREOF

CROSS-REFERENCE TO RELATED APPLICATIONS

The instant patent application claims priority to and the benefit of U.S. Provisional Patent Application Ser. No. 61/762,291, filed on Feb. 7, 2013, titled "Panel With Magnets And Covered With Parchment And Process Thereof," the entire disclosure of which provisional application is incorporated herein by reference.

FIELD OF THE INVENTION

The present invention relates generally to a tile or panel having at least one magnetic material embedded therein, and fully or partially covered with at least one layer of parchment. The invention also encompasses at least one discrete permanent magnet that is placed at an appropriate location within a panel or tile, and wherein at least a portion of the panel or tile and the at least one magnet are then optionally covered with at least one layer of at least one barrier material, and then at least one parchment layer partially or fully envelopes this assembly. The inventive tile having at least one magnetic type material can have at least one indicia or design on at least one surface, and the inventive tile can be magnetically attached to a wall or another panel having at least one magnetic type material to form a wall or panel surface.

BACKGROUND INFORMATION

Panels of various shapes and sizes have been known and used for many years to protect various surfaces, and for a variety of reasons.

Magnets and magnetic material have been used in many applications, and for a variety of purposes.

U.S. Pat. No. 4,536,428 (Yasuzo Murata, et al.), the entire disclosure of which is incorporated herein by reference, discloses a magnetic display panel having a transparent or translucent front substrate and a rear substrate bonded thereto by an adhesive with a dispersing liquid confining space formed between the substrates, preferably in the form of multiple cells. The dispersing liquid, composed of a fine particulate thickener, fine magnetic particles, a colorant and a dispersing medium, has a yield value of at least 5 dyne/$cm^2$. A clear, long-lasting image is recordable by tracing a permanent magnet upon the face of the first substrate.

U.S. Pat. No. 4,910,459 (Yoshimoto Odagawa, et al.), the entire disclosure of which is incorporated herein by reference, discloses a magnetic tile sensor that has a permanent magnet having a surface coated with a magnetic fluid and housed in a hollow portion of a nonmagnetic case, and a magnetic sensing element arranged outside the bottom portion of the case. When the case is tilted or is abruptly moved, the permanent magnet in the case is relatively displaced. The magnetic sensing element detects this displacement. Since the nonmagnetic case is sealed by a cold welding method, workability and reliability can be increased. In addition, a cap having a predetermined weight covers the permanent magnet so that a response characteristic is improved.

U.S. Pat. No. 5,184,395 (Antonio Pan, et al.), the entire disclosure of which is incorporated herein by reference, discloses a process for the manufacture of magnetic field generators including the steps of marking at least one tile made of conventional material with an identification code; cutting each marked tile into n strips having two dimensions and A-A axis orientation same as the initial tile; rotating the strips 90 degree to obtain rotated strips having a second A-A axis orientation; selecting and rearranging the rotated strips to obtain the desired characteristics of symmetry and compensation of the magnetic characteristic variations of the input tiles; assembling the rotated strips to form a new tile with different A-A axis orientation; cutting the assembled tiles into portions or sections of predetermined geometric shape; magnetizing the sections; assembling a set of these sections into magnet forming elements; tuning the magnet forming elements; assembling the elements to obtain finished magnets; and tuning the finished magnets.

U.S. Pat. No. 5,347,733 (Richard W. Whittington), the entire disclosure of which is incorporated herein by reference, discloses a magnetic name tag that has a pole piece panel elongated in one direction and with opposite end portions. One or more magnets assembled with the pole piece panel establish respective separate, complete magnetic flux paths at each of the end portions. A magnetically attractive keep plate elongated in generally complementary relation to the pole piece panel carries indicia thereon. The keep plate is attracted towards the magnet by the magnetic flux paths which effect a stabilized magnetic holding attraction for the keep plate in any assembled orientation of the pole piece and magnet assembly relative to the keep plate.

U.S. Pat. No. 6,587,022 (Rita M. Devine), the entire disclosure of which is incorporated herein by reference, discloses a foldable, portable, magnetic tool mat. The tool mat includes generally rectangular obverse and reverse panels each formed of flexible material and connected together along substantially common side and end margins and along evenly spaced apart seam lines extending between said side margins defining elongated magnet bar holding portions. An elongated permanent magnet bar is held within each holding portion each without substantially inhibiting selective tool mat folding for fit and storage. The reverse panel is substantially thicker than the obverse panel for better wear characteristics and maximal magnetic attractive forces for tool and hardware retention. An attaching strap holds the tool mat.

U.S. Pat. No. 7,896,309 (Nicholas DiGiammo), the entire disclosure of which is incorporated herein by reference, discloses an alignment tool which includes a cylindrical coil extending outward from one side of a steel base plate. The opposite side of the base plate includes a raised center lip portion for alignment and placement of a magnet thereon. The magnet includes a partially magnetic steel form attachment surface. The alignment tool cylindrical coil is screwed into a foam panel leaving the partially magnetic side exposed and substantially flush with a foam panel side. One or more alignment tools may be secured to a foam panel depending on the dimensions of the panel. The foam panels are then placed in a concrete form with the alignment tool partially magnetic side attaching to a concrete form steel member. The alignment tool keeps the foam panel secured and stable within the form while the form is being filled with concrete.

U.S. Patent Publication No. 2003/0005613 (Mack Daniel Gleekel, et al.), the entire disclosure of which is incorporated herein by reference, discloses a magnetic-backed plaque having a clock on its front side which is used as an award plaque or promotional plaque. A back side of the magnetic-backed plaque includes recessed areas for retaining a battery and for accommodating a nail or a hook for attaching the plaque to a non-magnet attracting surface. The plaque also includes a magnetic sheet attached to the back side of the panel member so that the magnetic sheet covers at least half of the back side of the panel member.

U.S. Patent Publication No. 2005/0237138 (Andreas Reymann), the entire disclosure of which is incorporated herein by reference, discloses an anchoring magnet for anchoring onto a magnetic or magnetizable substrate that has a plurality of panel-shaped magnet elements extending in parallel fashion and panel-shaped pole elements extending parallel thereto. The magnet and pole elements are clamped alternatingly into an assemblage. The magnet elements have nonmagnetic protective layers. The protective layers are joined exclusively to the magnet elements.

This invention improves on the deficiencies of the prior art and provides an inventive panel or tile.

PURPOSES AND SUMMARY OF THE INVENTION

The invention is a novel panel or tile having at least one discrete magnet or magnetic material embedded therein, and wherein the inventive panel or tile and the at least one discrete magnet or magnetic material are covered with at least one layer of a barrier material, and which assembly is then fully or partially enveloped by at least one layer of parchment.

Therefore, one purpose of this invention is to provide a cost effective, and durable novel panel or tile having at least one discrete magnet or magnetic material embedded therein.

Another purpose of this invention is to provide the inventive panel or tile having at least one discrete magnet or magnetic material embedded therein and covered or having protected with at least one layer of at least one barrier material.

Yet another purpose of this invention is to completely or partially envelope the inventive panel or tile having the at least one discrete magnet or magnetic material embedded therein with at least one layer of parchment material.

Still yet another purpose of this invention is to provide a wall or surface having at least one ferrous or magnetic type material therein, to magnetically attract and secure the inventive panel or tile having the at least one discrete magnet or ferrous material embedded therein and secured thereto.

Therefore, in one aspect this invention comprises a magnetic tile, comprising:
(a) at least one non-magnetic material tile;
(b) at least one magnetic material embedded in said at least one non-magnetic material tile; and
(c) at least one layer of parchment envelopes at least a portion of said at least one non-magnetic material tile having said at least one magnetic material embedded therein to form said magnetic tile.

In another aspect this invention comprises a magnetic tile, comprising:
(a) at least one non-magnetic material tile;
(b) at least one magnetic material embedded in said at least one non-magnetic material tile;
(c) at least one first barrier material layer covering a first surface of said at least one non-magnetic material tile;
(d) at least one second barrier material layer covering a second surface of said at least one non-magnetic material tile;
(e) at least one layer of parchment envelopes at least a portion of said at least one first barrier material layer, said at least one second barrier material layer, and said at least one non-magnetic material tile having said at least one magnetic material embedded therein to form said magnetic tile.

In yet another aspect this invention comprises a magnetic tile, comprising:
(a) at least one non-magnetic material tile, said at least one non-magnetic material tile having at least one opening;
(b) at least one magnetic material inserted and secured inside said at least one opening in said at least one non-magnetic material tile;
(c) at least one first barrier material layer covering a first surface of said at least one non-magnetic material tile;
(d) at least one second barrier material layer covering a second surface of said at least one non-magnetic material tile;
(e) at least one layer of parchment completely enveloping said at least one first barrier material layer, said at least one second barrier material layer, and said at least one non-magnetic material tile having said at least one magnetic material inserted and secured inside said at least one opening to form said magnetic tile.

BRIEF DESCRIPTION OF THE DRAWINGS

Although the scope of the present invention is much broader than any particular embodiment, a detailed description of the preferred embodiment follows together with drawings. These drawings are for illustration purposes only and are not drawn to scale. Like numbers represent like features and components in the drawings. The invention may best be understood by reference to the ensuing detailed description in conjunction with the drawings in which.

DETAILED DESCRIPTION

Figure 1:
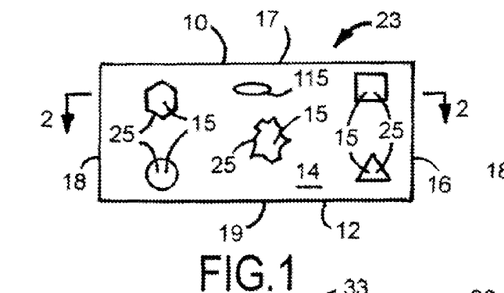
FIG. 1 illustrates a top view of a magnetic tile or panel according to a first embodiment of this invention.

FIG. 1 illustrates a top view of a magnetic tile or panel 23, according to a first embodiment of this invention. As illustrated in FIG. 1, the magnetic panel or the 23, comprises of a non-magnetic panel or tile 10, having at least one opening or hole or blind hole 15. And, wherein at least one discrete magnet or magnetic type material 25, is securely placed inside the opening or hole or blind hole 15, so as to create a magnetic panel or tile 23, which can either attract a magnet or be attracted to a magnet. The non-magnetic tile or panel 10, has a first or side edge 16, a second or side edge 17, a third or side edge 18, and a fourth or side edge 19. The nonmagnetic panel or tile 10, is preferably made of a Homasote-type material 10, or a cellulose based fiber wall board 10. Homasote is a trademark of Agasote Millboard Co. Homasote products are generically known as cellulose based fiber wall board 10, which is similar in composition to papier-mache, made from recycled paper that is compressed under high temperature and pressure and held together with glue. The Homasote sheets 10, typically an ½ or ⅜ inch thick, 4 feet wide, and 8 feet long. Cork 10, plywood 10, hardboard 10, drywall 10, and foam insulation 10, are common alternatives to Homasote 10. The magnetic tile or panel 23, has a first surface or a bottom surface or a lower plane or base or lower surface 12, and a second surface or an upper surface or an upper plane or a top surface 14, as more clearly shown in FIG. 2.

The openings or holes 15, could be pre-drilled or customized for the insertion or placement of a corresponding magnet or a magnetic material 25. For some applications one could have one or more spare openings or holes 115, as more clearly shown in FIG. 2, that could be left empty for any future use for the placement of the magnet or magnetic material 25.

The discrete magnets 25, or magnetic type material 25, can be of any size, shape, and form. The cross-sectional shape of the discrete magnet 25, or magnetic type material 25, are preferably selected from a group comprising a triangular-shape, a square-shape, a rectangular-shape, a circular-shape, an oval-shape, a multisided-shape, a polygonal-shape, an odd-shape, an irregular-shape, to name a few. For some applications it is preferred that the discrete magnets 25, is a permanent magnet 25. However, for some applications the magnetic type material 25, could be any material 25, that is either a magnet 25, or attracted to a magnetic material, such as, for example, iron 25, steel 25, stainless steel 25, a ferrous material 25, a composite material containing ferrous particles 25, a rare earth magnet 25, to name a few.

Figure 2:
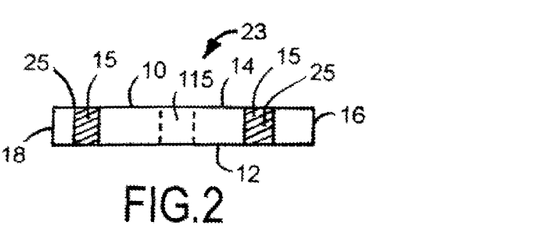
FIG. 2 illustrates a side cut-away view of the magnetic the or panel according to the first embodiment of this invention taken along section 2-2, of FIG. 1.

FIG. 2 illustrates a side cut-away view of the magnetic tile or panel 23, according to the first embodiment of this invention taken along section 2-2, of FIG. 1. It is preferred that for some applications the at least one discrete magnet 25, or magnetic material 25, that is within the opening or hole 15, is substantially along the bottom surface or plane or base or lower surface 12, of the nonmagnetic panel or tile 10, while the top surface or plane or upper end of the discrete magnet 25, or magnetic material 25, is substantially along the top surface or plane or upper surface 14, of the non-magnetic panel or tile 10.

Figure 3:
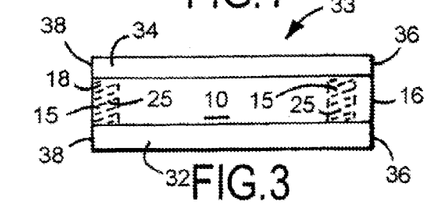
FIG. 3 illustrates a side cut-away view of a magnetic tile or panel according to a second embodiment of this invention, wherein the magnetic tile or panel has at least one layer of at least one barrier material.

FIG. 3 illustrates a side cut-away view of a magnetic tile or panel 33, according to a second embodiment of this invention, wherein the magnetic tile or panel 33, has at least one layer 32, 34, of at least one barrier material 32, 34. For some applications it is preferred that the at least one first layer 32, of the at least one first barrier material 32, is along the base or lower surface 12, of the non-magnetic panel or tile 10, and at least one second layer 34, of the at least one second barrier material 34, is along the top or upper surface 14, of the non-magnetic panel or tile 10. With this configuration the bottom end, and the top end, of the discrete magnet 25, or magnetic material 25, would be contained, and protected, by the upper and lower barrier material layers 32, 34. The first and second barrier material layers 32, 34, have a first edge 36, and a second edge 38, and it is preferred that the first edge 36, is substantially parallel or co-planer with the first or side edge 16, while the second edge 38, is substantially parallel or co-planer with the third or side edge 18.

Figure 4:
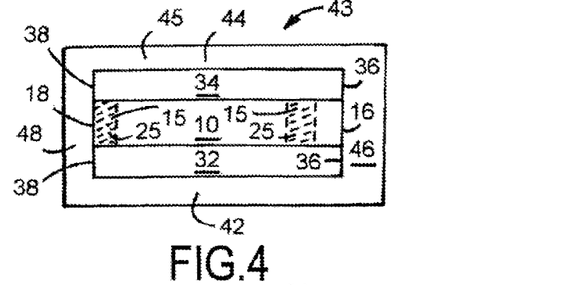
FIG. 4 illustrates a side view of a magnetic tile or panel according to a third embodiment of this invention, wherein the inventive magnetic tile or panel is protected with at least one layer of at least one barrier material, and at least one layer of parchment.

FIG. 4 illustrates a side view of a magnetic the or panel 43, according to a third embodiment of this invention, wherein the inventive magnetic tile or panel 43, is protected with at least one layer 32, 34, of at least one barrier material 32, 34, and at least one layer of parchment 45. For some applications, it is preferred that the at least one layer of the parchment material 45, completely envelopes the magnetic tile or panel 23, 33, having the discrete magnet 25, or magnetic material 25, and optionally at least one barrier material layer 32, 34, such that the edges 16, 36, are completely covered and protected by at least one side or edge layer 46, of the parchment material 45, and similarly, the edges 18, 38, are completely covered and protected by at least one side or edge layer 48, of the parchment material 45. A first or side or bottom layer 42, of the parchment material 45, completely covers and protects the bottom or lower surface 12, or the bottom surface layer of the bottom barrier material 32. Similarly, a second or side or top layer 44, of the parchment material 45, completely covers and protects the top or upper surface 14, or the top surface layer of the top barrier material 34.

Figure 5:
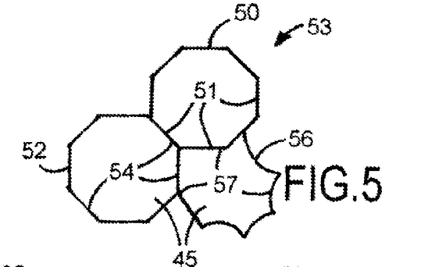
FIG. 5 illustrates a top view of a magnetic tile or panel according to a fourth embodiment of this invention, and wherein the magnetic the or panel is covered with a barrier material, and then enveloped in at least one layer of parchment.

FIG. 5 illustrates a top view of a magnetic tile or panel 53, according to a fourth embodiment of this invention, and wherein the magnetic tile or panel 53, is optionally covered with at least one barrier material 32, 34, and then enveloped in at least one layer of parchment 45. The magnetic tile or panel 53, can comprise of individual tile or panel 50, having an edge 51, of individual the or panel 52, having an edge 54, of individual tile or panel 56, having an edge 57. As one can appreciate that individual tiles or panels 50, 52, 56, can be placed in such a way so that one or more of their edges 51, 54, 57, are next to each other so as to form a larger magnetic tile or panel 53. The shape of the edges 51, 54, 57, can be straight, curved, an odd shape, to name a few. It should be appreciated that the inventive panels 50, 52, 56, can have, for example, a polygonal shape 50, 52, 56, and can be arranged into a pattern, such as, for example, a honeycomb-type pattern 53, a polygonal shaped pattern 53, to name a few.

Figure 6:
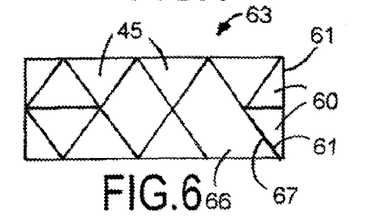
FIG. 6 illustrates a top view of a magnetic the or panel according to a firth embodiment of this invention, and wherein the magnetic tile or panel is covered with a barrier material, and then enveloped in at least one layer of parchment.

FIG. 6 illustrates a top view of a magnetic the or panel 63, according to a fifth embodiment of this invention, and wherein the magnetic tile or panel 63, is optionally covered with at least one harrier material 32, 34, and then enveloped in at least one layer of parchment 45. The magnetic tile or panel 63, can comprise of individual tile or panel 60, having an edge 61, of individual tile or panel 66, having an edge 67. As one can appreciate that individual tiles or panels 60, 66, can be placed in such a way so that one or more of their edges 61, 67, are next to each other so as to form a larger magnetic tile or panel 63. The shape of the edges 61, 67, can be straight, curved, an odd shape, to name a few. It should be appreciated that the inventive panels 60, 66, can have, for example, a triangular shape 60, a rectangular shape 66, a rhombic shape 66, a polygonal shape 60, 66, and can be arranged into a pattern, such as, for example, an interlocking triangular pattern 63, a rectangular pattern 63, a rhombic pattern 63, a polygonal pattern 63, to name a few.

Figure 7:
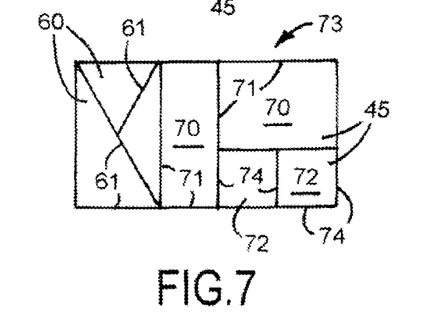
FIG. 7 illustrates a top view of a magnetic tile or panel according to a sixth embodiment of this invention, and wherein the magnetic tile or panel is covered with a barrier material, and then enveloped in at least one layer of parchment.

FIG. 7 illustrates a top view of a magnetic tile or panel 73, according to a sixth embodiment of this invention, and wherein the magnetic tile or panel 73, is optionally covered with at least one barrier material 32, 34, and then enveloped in at least one layer of parchment 45. The magnetic tile or panel 73, can comprise of individual tile or panel 60, having an edge 61, of individual tile or panel 70, having an edge 71, of individual tile or panel 72, having an edge 74. As one can appreciate that individual tiles or panels 60, 70, 72, can be placed in such a way so that one or more of their edges 61, 71, 74, are next to each other so as to form a larger magnetic tile or panel 73. The shape of the edges 61, 71, 74, can be straight, curved, an odd shape, to name a few. It should be appreciated that the inventive panels 60, 70, 72, can have, for example, a triangular shape 60, 70, 72, a square shape 60, 70, 72, a rectangular shape 60, 70, 72, a polygonal shape 60, 70, 72, to name a few, and these individual inventive panels 60, 70, 72, can be arranged into a pattern, such as, for example, a square pattern 73, a rectangular pattern 73, a polygonal pattern 73, to name a few, when the individual tiles or panels 60, 70, 72, are placed adjacent to each other.

Figure 8:
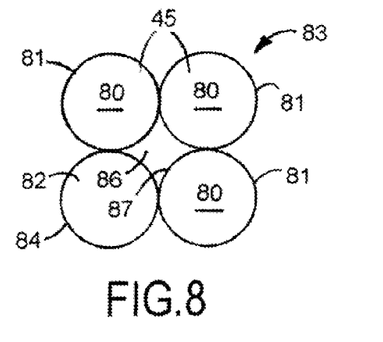
FIG. 8 illustrates a top view of a magnetic tile or panel according to a seventh embodiment of this invention, and wherein the magnetic the or panel is covered with a barrier material, and then enveloped in at least one layer of parchment.

FIG. 8 illustrates a top view of a magnetic the or panel 83, according to a seventh embodiment of this invention, and wherein the magnetic tile or panel 83, is optionally covered with at least one barrier material 32, 34, and then enveloped in at least one layer of parchment 45. The magnetic tile or panel 83, can comprise of individual tile or panel 80, having an edge 81, of individual tile or panel 82, having an edge 84, of individual the or panel 86, having an edge 87. As one can appreciate that individual tiles or panels 80, 82, 86, can be placed in such a way so that one or more of their edges 81, 84, 87, are next to each other so as to form a larger magnetic tile or panel 83. The shape of the edges 81, 84, 87, can be straight, curved, an odd shape, to name a few. It should be appreciated that the inventive panels 80, 82, can have, for example, a circular shape 80, 82, an elliptical shape 80, 82, and can be arranged into a pattern, such as, for example, a circular pattern 80, 82, an oval pattern 80, 82, an elliptical pattern 80, 82, to name a few, and wherein the inner panel 86, could be a customized interior-shaped panel or tile 86, having customized edge 87.

Figure 9A:
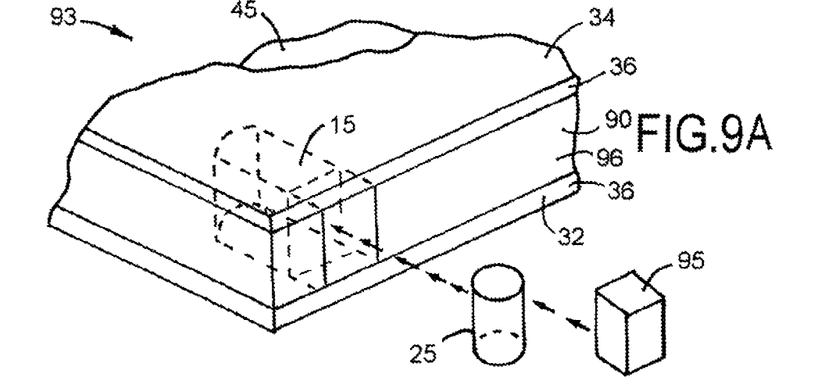
FIG. 9A illustrates an enlarged cut-away view of a magnetic tile or panel according to an eighth embodiment of this invention.

FIG. 9A illustrates an enlarged cut-away view of a magnetic tile or panel 93, according to an eighth embodiment of this invention. As illustrated in FIG. 9A, the at least one composite material 90, or core material 90, or non-magnetic layer 90, having an edge 96, is sandwiched between at least one barrier material 32, 34, or laminate material 32, 34. The non-magnetic material layer 90, has at least one cut or opening or blind hole or slot 15, in the side or edge 96, of the non-magnetic tile or panel 90, so that at least one magnet 25, or magnetic material 25, can be inserted there-through and securely placed inside the opening 15, within the non-magnetic tile or panel 90. After the at least one magnet 25, or the magnetic material 25, has been securely inserted and placed inside the opening 15, it is preferred that at least one plug 95, or plug type material 95, is inserted into the side of the opening 15, so as to secure the magnet 25, or the magnetic material 25, within the opening 15. It is preferred that the magnet 25, or magnetic material 25, is inserted into the opening 15, in such a way that the poles are oriented perpendicular to the large flat surface of the non-magnetic tile or panel 90. Such a place of the magnet 25, or magnetic material 25, will leave the large flat surface 12, 14, uncompromised, and would allow one to embed the magnet 25, or magnetic material 25, inside the core material 90, between the laminate or parchment 45, and the barrier material 32, 34, instead of drilling holes 15, through the large flat surface 12, 14, of the non-magnetic panel or tile 90.

Figure 9B:
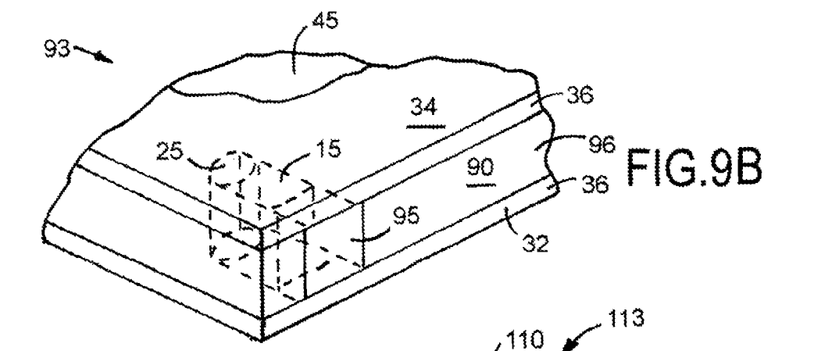
FIG. 9B illustrates an enlarged cut-away view of the eighth embodiment of the magnetic tile or panel of FIG. 9A, illustrating the installation of at least one magnetic type material and at least one plug material.

FIG. 9B illustrates an enlarged cut-away view of the eighth embodiment of the magnetic tile or panel 93, of FIG. 9A, illustrating the installation of at least one magnetic type material 25, and at least one plug material 95. Once the magnet 25, or magnetic material 25, is securely placed inside the opening or slot 15, on the side of the non-magnetic tile or panel 90, it would then be preferably plugged with at least one plug 95, or material 95, to fill the open surface 15, of the non-magnetic material 90. It is preferred that the plug 95, is placed in such a way that it is made flush or parallel with the exterior surface or edge 96, of the non-magnetic tile or panel 90. For some applications the plug 95, could be a magnet 95, or a magnetic material 95.

Figure 10:
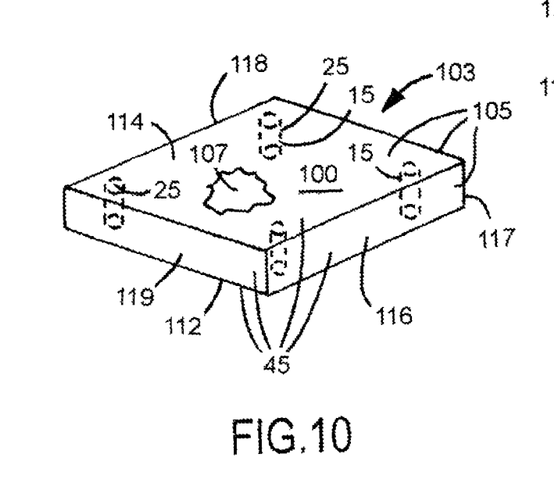
FIG. 10 illustrates a perspective view of a magnetic tile or panel according to a ninth embodiment of this invention.

FIG. 10 illustrates a perspective view of a magnetic tile or panel 10 according to a ninth embodiment of this invention. The magnetic tile or panel 103, comprises of a plurality of magnet 25, or magnetic material 25, contained within a non-magnetic tile or panel 100, and completely covered or enveloped by at least one layer of parchment 105. The magnetic tile or panel 103, has as first or lower or bottom or back or concealed or interior surface 112, a second or upper or face or front or exposed or exterior surface 114, a first or side or inner edge 116, a second or side or inner edge 117, a third or side or inner edge 118, a fourth or side or inner edge 119, which are all completely covered or protected by the at least one layer of parchment 105. For some applications one could also have a design or indicia 107, on at least one surface 112, 114, 116, 117, 118, 119, of the magnetic tile or panel 103.

Figure 11:
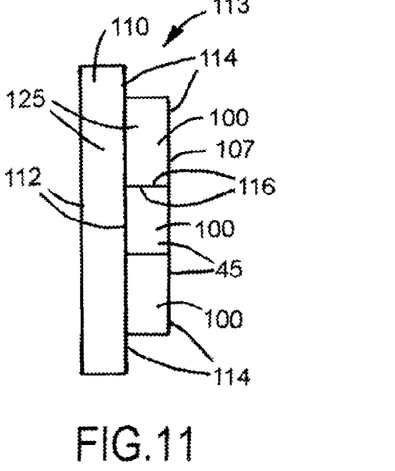
FIG. 11 illustrates a perspective view of a magnetic tile or panel according to a tenth embodiment of this invention, showing the magnetic tile or panel as magnetically secured to a wall or surface having at least one magnetic type material.

FIG. 11 illustrates a perspective view of a magnetic tile or panel 113, according to a tenth embodiment of this invention, showing a magnetic tile or panel 100, having at least one magnet 125, or magnetic material 125, and enveloped with at least one layer of parchment 105, as magnetically secured to a wall or panel or surface 110, having at least one magnet 125, or magnetic type material 125. For some applications it is preferred that the magnetic tile or panel 100, has a magnet 125, while the wall or panel 110, has a magnetic material 125, such that once the magnetic tile or panel 100, is brought close to the wall or panel 110, the magnetic tile or panel 100, would magnetically be attracted to the wall or panel 110, and be magnetically, securely, held thereto. It does not matter if the magnetic tile 100, or the magnetic wall 110, has the magnet 125, as long as one of them have the magnet 125, and the other has a magnetic material 125, or a magnet 125. It should be appreciated that the wall or panel or surface 110, may or may not have a layer of parchment, but it must have a magnet 125, or a magnetic material 125, to magnetically attract and securely hold onto the wall or panel or surface 100. It should be understood that the wall or panel or surface 100, could be a wall 100, a floor 100, a ceiling 100, to name a few.

Figure 12:
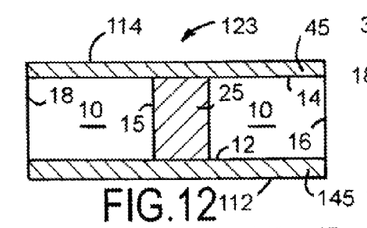
FIG. 12 illustrates a side cut-away view of a magnetic tile or panel according to an eleventh embodiment of this invention, wherein the magnetic tile or panel has at least one layer of parchment.

FIG. 12 illustrates a side cut-away view of a magnetic tile or panel 123, according to an eleventh embodiment of this invention, wherein the magnetic tile or panel 123, has at least one layer of parchment 45, along at least a portion of the top or upper surface 14, of the non-magnetic panel or the 10. The magnetic tile or panel 123, may have one opening or hole 15, for at least one magnet, or magnetic material 25. For some applications one could also have at least one layer of parchment 145, along a portion of the base or lower surface 12, of the non-magnetic panel or tile 10.

Figure 13:
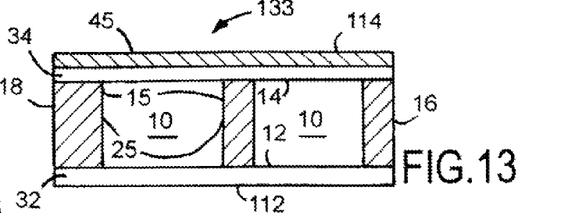
FIG. 13 illustrates a side cut-away view of a magnetic tile or panel according to a twelfth embodiment of this invention, wherein the magnetic tile or panel has at least one layer of at least one barrier material, and at least one layer of parchment.

FIG. 13 illustrates a side cut-away view of a magnetic tile or panel 133, according to a twelfth embodiment of this invention, wherein the magnetic tile or panel 133, has at least one layer of at least one barrier material 34, and at least one layer of parchment 45, at least along a portion of the top or upper surface 14, of the non-magnetic panel or tile 10. For some applications one could also have at least one layer of at least one second barrier material 32, along a portion of the base or lower surface 12, of the non-magnetic panel or tile 10. For some applications one could also have at least one layer of parchment 145, that is joined or mated with another layer of parchment 45, along an edge or seam or joint 135. It is preferred that the seam or edge or joint 135, is along the sides 16, 116, 17, 117, 18, 118, 19, 119, or the interior surface 12, 112, so that it does not create a visual distraction for the exterior or exposed surface or face 14, 114. The joining or mating of the one or more layers of parchment 45, 145, so as to form a larger parchment layer 45, 145, allows the use of scrap or discarded parchment material to be used with this invention.

Figure 14:
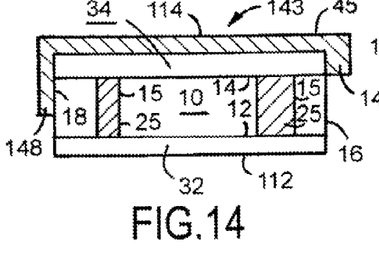
FIG. 14 illustrates a side cut-away view of a magnetic tile or panel according to a thirteenth embodiment of this invention, wherein the magnetic tile or panel has at least one layer of at least one barrier material, and at least one layer of parchment.

FIG. 14 illustrates a side cut-away view of a magnetic tile or panel 143, according to a thirteenth embodiment of this invention, wherein the magnetic tile or panel 143, has at least one layer of at least one barrier material 34, and at least one layer of parchment 45, at least along a portion of the top or upper surface 14, of the non-magnetic panel or tile 10. For some applications one could also have at least one layer of at least one second barrier material 32, along a portion of the base or lower surface 12, of the non-magnetic panel or tile 10. For some applications the parchment layer 45, could extend along at least a portion of the side edges of the non-magnetic panel or tile 10, such as, along edge or side 16, 17, 18, and 19, of the magnetic tile or panel 143, forming a parchment edge or lip or extension or partial edge 146, 148.

Figure 15:
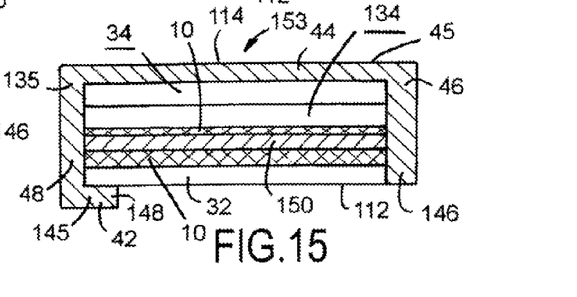
FIG. 15 illustrates a side cut-away view of a magnetic tile or panel according to as fourteenth embodiment of this invention, wherein the magnetic tile or panel has at least one layer of at least one barrier material, and at least one layer of parchment.

FIG. 15 illustrates a side cut-away view of a magnetic tile or panel 153, according to a fourteenth embodiment of this invention, wherein the magnetic tile or panel 153, has at least one layer of at least one first barrier material 34, and at least one layer of at least one second barrier material 134, and at least one layer of parchment 45, at least along a portion of the top or upper surface 14, of the non-magnetic panel or the 10. For some applications one could also have at least one layer of at least one third barrier material 32, along a portion of the base or lower surface 12, of the non-magnetic panel or the 10. For some applications the parchment layer 45, could extend along at least a portion of the side edges of the non-magnetic panel or tile 10, such as, along edge or side 16, 17, 18, and/or 19. The layer of parchment 45, could terminate at the edge of edge or side 16, 17, 18, and/or 19, or could extend onto the lower or interior surface 112, of the magnetic tile or panel 153, forming a parchment edge or lip or extension or partial edge 146, 148.

Figure 16:
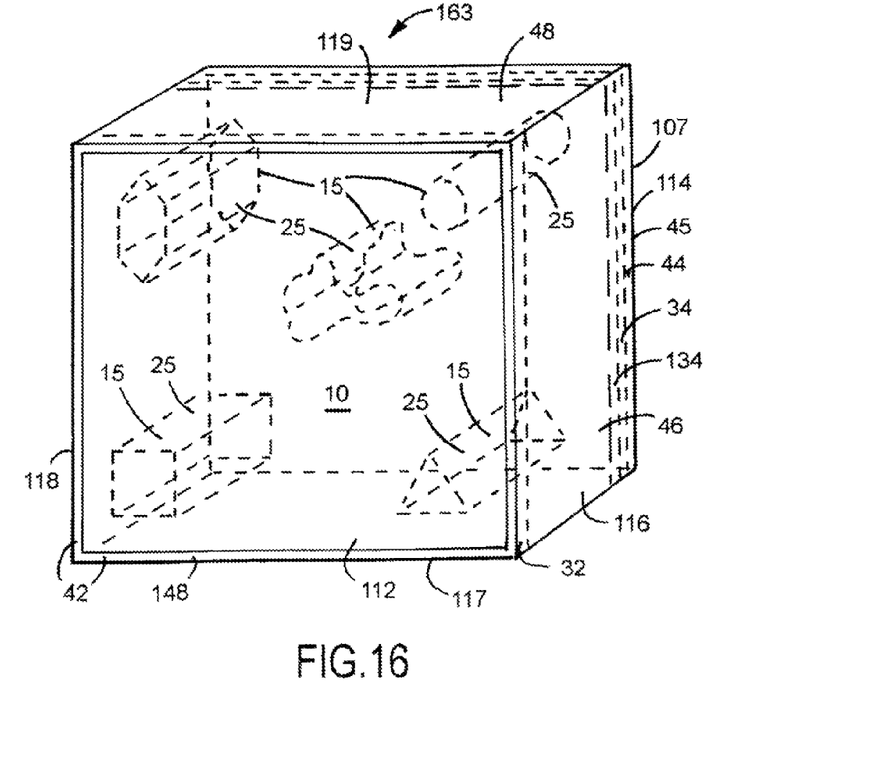
FIG. 16 illustrates a perspective view of a magnetic tile or panel according to a fifteenth embodiment of this invention, wherein the magnetic tile or panel has at least one layer of at least one barrier material, and at least one layer of parchment.

FIG. 16 illustrates a perspective view of a magnetic tile or panel 163, according to a fifteenth embodiment of this invention, wherein the magnetic tile or panel 163, has at least one layer of at least one first barrier material 34, and at least one layer of at least one second barrier material 134, and at least one layer of parchment 45, at least along a portion of the top or upper surface 14, of the non-magnetic panel or tile 10. For some applications one could also have at least one layer of at least one third barrier material 32, along a portion of the base or lower surface 12, of the non-magnetic panel or tile 10. For some applications the parchment layer 45, could extend along at least a portion of the side edges of the non-magnetic panel or tile 10, such as, along edge or side 116, 117, 118, and/or 119. The layer of parchment 45, could terminate at the edge of edge or side 116, 117, 118, and/or 119, or could extend onto the lower or interior surface 112, of the magnetic tile or panel 163, forming a parchment edge or lip or extension or partial edge 146, 148.

For most applications it is preferred that the at least one layer of parchment 45, 145, is configured such that the parchment layer completely covers the face or exposed or exterior surface of the magnetic tile or panel 23, 33, 43, 53, 63, 73, 83, 93, 103, 113, 123, 133, 143, 153, and 163, such that the ends of the parchment 45, 145, are substantially parallel or co-planer with the first or side edge 16, 116, the second or side edge 17, 117, the third or side edge 18, 118, and the fourth or side edge 19, 119.

It should be appreciated that parchment 45, 105, is a thin material made from hide, such as, calfskin, sheepskin or goatskin, and can also be split. It is, and has been used as a material for writing on, for example, for documents, notes, or the pages of a book, codex or manuscript. Parchment 45, 105, is distinct from leather, in that parchment 45, 105, is limed but not tanned; therefore, it is very reactive to changes in relative humidity and is not inherently waterproof.

For some applications the magnetic wall or ferrous-type material or surface or panel 110, could be, for example, a galvanized metallic sheet 110, whose outer or exterior surface 114, could be covered with a "recipient magnetic tile or panel", such as magnetic tile or panel 23, 33, 43, 53, 63, 73, 83, 93, 100, 103, 113, 123, 133, 143, 153, and 163.

It should be appreciated that the cross-sectional shape of the magnetic tile or panel 23, 33, 43, 53, 63, 73, 83, 93, 103, 113, could be selected from a group comprising of a rectangular shape, a triangular shape, a circular shape, an elliptical shape, a polygonal shape, an ornamental-type shape, an irregular shape, an odd shape, a customized shape, just to name a few.

It should be understood that the magnetic tile or panel 23, 33, 43, 53, 63, 73, 83, 93, 103, 113, are removable from their magnetic mounting system or host 110, and thus this allows the placing and replacing of the magnetic tile or panel pieces 23, 33, 43, 53, 63, 73, 83, 93, 103, 113, as one would insert or remove puzzle pieces, and this could be done for a single magnetic tile, or some of the magnetic tiles, or all of the magnetic tiles. With this invention the magnetic the or panel 23, 33, 43, 53, 63, 73, 83, 93, 103, 113, can be removed or changed at any time as desired by the user without affecting the rest of the exterior surface 114, of the magnetic will or panel 110. This invention also allows the reconfiguration of the layout or pattern that can be changed or updated as desired by the user. Similarly, this invention allows for the easy lifting and removal, cleaning, replacement, repair, etc. of one or more of the magnetic tile or panel 23, 33, 43, 53, 63, 73, 83, 93, 103, 113, as preferred by the user.

The various embodiments and examples have used the term parchment 45, 145, however, it should be understood that one could either replace or supplement the parchment material or layer 45, 145, with at least one layer of leather, a fabric, a fibrous material, a synthetic material, a hair on hide material, an animal hide, to name a few.

For some applications one could also use an adhesive magnetic peel-and-stick tape 148, or a double-sided magnetic tape 148, to secure the individual magnetic tile or panel 23, 33, 43, 53, 63, 73, 83, 93, 103, 113, to the exterior surface 114, of the magnetic wall or panel 110.

It should also be appreciated that the magnetic tile or panel 23, 33, 43, 53, 63, 73, 83, 93, 103, 11.3, could have at least one inscription 107, and wherein the inscription 107, could be selected from a group comprising of a design, an indicia, a drawing, a photograph, a scenery, a picture, an illustration, a gesture, a smiley-type face, a phrase, a statement, a rhyme, an alphabet, a numeral, a symbol, a visual message, a graphic image, a verbiage, just to name a few.

It should be understood that the first or lower or bottom or back or concealed or interior surface 112, can have at least one inscription 107, and that the second or upper or face or front or exposed or exterior surface 114, could also have at least one inscription 107, and thus this would allow for flipping or switching the face 114, of the magnetic tile or panel 23, 33, 43, 53, 63, 73, 83, 93, 103, 113, as desired by the user. Also if one of the magnetic tile or panel 23, 33, 43, 53, 63, 73, 83, 93, 103, 113, got damaged or did not fit the pattern, then the user could easily either flip or switch the face 114, with the face 112, or replace the magnetic tile or panel 23, 33, 43, 53, 63, 73, 83, 93, 103, 113.

The first barrier material or layer 32, or the second barrier material or layer 34, or the third barrier material or layer 134, could be selected from a group comprising a non-magnetic material, paper, cardboard, a cellulose material, a non-magnetic rigid material, a non-magnetic rigid laminate, a non-magnetic rigid fibrous material, a non-magnetic rigid composite material, and combinations thereof, to name a few.

For some applications, barrier material or layer 32, 34, 134, could act as a stiffer barrier material or layer 32, 34, 134, because for some applications the non-magnetic core material or layer 10, 90, may be soft or brittle, and may need extra protection and/or dimensional stability or as a secondary protection material or layer.

For some applications it is preferred that the magnetic material or discrete magnet 25, that is embedded in the non-magnetic material tile or panel 10, has a first or north or south magnetic pole surface 12, 14, that is coplanar with a first or an upper surface or a lower surface 12, 14, of the non-magnetic material tile 10, and a second or south or north magnetic pole surface 14, 12, that is coplanar with a second or lower or upper surface 14, 12, of the non-magnetic material tile 10, as more clearly shown in FIG. 1, and FIG. 2.

While the present invention has been particularly described in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A magnetic tile, comprising:
(a) at least one non-magnetic material tile;
(b) at least one magnetic material embedded in said at least one non-magnetic material tile; and
(c) at least one layer of parchment envelopes at least a portion of said at least one non-magnetic material tile having said at least one magnetic material embedded therein to form said magnetic tile, and wherein material of said at least one non-magnetic material tile is selected from a group consisting of cork, plywood, hardboard, drywall, foam insulation, cellulose based fiber wall board, and combinations thereof.

2. The magnetic tile of claim 1, wherein said at least one magnetic material is a discrete magnet, and wherein said at least one discrete magnet is embedded in said at least one non-magnetic material tile, such that a first magnetic pole of said at least one discrete magnet is coplanar with an upper surface of said at least one non-magnetic material tile, and a second magnetic pole of said at least one discrete magnet is coplanar with a lower surface of said at least one non-magnetic material tile.

3. The magnetic tile of claim 1, wherein the shape of said at least one magnetic material is selected from a group consisting of a triangular-shaped discrete magnet, a square-shaped discrete magnet, a rectangular-shaped discrete magnet, a circular-shaped discrete magnet, an elliptical-shaped discrete magnet, a multisided-shaped discrete magnet, a polygonal-shaped discrete magnet, an odd-shaped discrete magnet, an irregular-shaped discrete magnet, and combinations thereof.

4. The magnetic tile of claim 1, wherein the shape of said magnetic tile is selected from a group consisting of a triangular shape, a square shape, a rectangular shape, a rhombic shape, a circular shape, an elliptical shape, a polygonal shape, an odd shape, an irregular shape, and combinations thereof.

5. The magnetic tile of claim 1, wherein a surface of said parchment has at least one inscription, and wherein said inscription is selected from a group consisting of a design, an indicia, a drawing, a photograph, a scenery, a picture, an illustration, a gesture, a smiley-type face, a phrase, a statement, a rhyme, an alphabet, a numeral, a symbol, a visual message, a graphic image, a verbiage, and combinations thereof.

6. A magnetic tile, comprising:
(a) at least one non-magnetic material tile,
(b) at least one magnetic material embedded in said at least one non-magnetic material tile,
(c) at least one first barrier material layer covering a first surface of said at least one non-magnetic material tile;

(d) at least one second barrier material layer covering a second surface of said at least one non-magnetic material tile;

(e) at least one layer of parchment envelopes at least a portion of said at least one first barrier material layer, said at least one second barrier material layer, and said at least one non-magnetic material tile having said at least one magnetic material embedded therein to form said magnetic tile, and wherein material of said at least one non-magnetic material tile is selected from a group consisting of cork, plywood hardboard, drywall, foam insulation, cellulose based fiber wall board, and combinations thereof.

7. The magnetic tile of claim 6, wherein said at least one magnetic material is a discrete magnet, and wherein said at least one discrete magnet is embedded in said at least one non-magnetic material tile, such that a first magnetic pole of said at least one discrete magnet is coplanar with an upper surface of said at least one non-magnetic material tile, and a second magnetic pole of said at least one discrete magnet is coplanar with a lower surface of said at least one non-magnetic material tile.

8. The magnetic tile of claim 6, wherein the shape of said at least one magnetic material is selected from a group consisting of a triangular-shaped discrete magnet, a square-shaped discrete magnet, a rectangular-shaped discrete magnet, a circular-shaped discrete magnet, an elliptical-shaped discrete magnet, a multisided-shaped discrete magnet, a polygonal-shaped discrete magnet, an odd-shaped discrete magnet, an irregular-shaped discrete magnet, and combinations thereof.

9. The magnetic tile of claim 6, wherein the shape of said magnetic tile is selected from a group consisting of a triangular shape, a square shape, a rectangular shape, a rhombic shape, a circular shape, an elliptical shape, a polygonal shape, an odd shape, an irregular shape, and combinations thereof.

10. The magnetic tile of claim 6, wherein a surface of said parchment has at least one inscription, and wherein said inscription is selected from a group consisting of a design, an indicia, a drawing, a photograph, a scenery, a picture, an illustration, a gesture, a smiley-type face, a phrase, a statement, a rhyme, an alphabet, a numeral, a symbol, a visual message, a graphic image, a verbiage, and combinations thereof.

11. The magnetic tile of claim 6, wherein material of one of said first barrier material layer and said second barrier material layer is selected from a group consisting of a non-magnetic material, paper, cardboard, a cellulose material, a non-magnetic rigid material, a non-magnetic rigid laminate, a non-magnetic rigid fibrous material, a non-magnetic rigid composite material, and combinations thereof.

12. A magnetic tile, comprising:
(a) at least one non-magnetic material tile, said at least one non-magnetic material tile having at least one opening,
(b) at least one magnetic material inserted and secured inside said at least one opening in said at least one non-magnetic material tile;
(c) at least one first barrier material layer covering a first surface of said at least one non-magnetic material tile;
(d) at least one second barrier material layer covering a second surface of said at least one non-magnetic material tile, (e) at least one layer of parchment completely enveloping said at least one first barrier material layer, said at least one second barrier material layer, and said at least one non-magnetic material tile having said at least one magnetic material inserted and secured inside said at least one opening to form said magnetic tile, and wherein material of said at least one non-magnetic material tile is selected from a group consisting of cork, plywood, hardboard, drywall, foam insulation, cellulose based fiber wall board, and combinations thereof.

13. The magnetic tile of claim 12, wherein said at least one magnetic material is a discrete magnet, and wherein said at least one discrete magnet is embedded in said at least one non-magnetic material tile, such that a first magnetic pole surface of said at least one discrete magnet is coplanar with an upper surface of said at least one non-magnetic material tile, and a second magnetic pole surface of said at least one discrete magnet is coplanar with a lower surface of said at least one non-magnetic material tile.

14. The magnetic tile of claim 12, wherein the shape of said at least one magnetic material is selected from a group consisting of a triangular-shaped discrete magnet, a square-shaped discrete magnet, a rectangular-shaped discrete magnet, a circular-shaped discrete magnet, an elliptical-shaped discrete magnet, a multisided-shaped discrete magnet, a polygonal-shaped discrete magnet, an odd-shaped discrete magnet, an irregular-shaped discrete magnet, and combinations thereof.

15. The magnetic tile of claim 12, wherein the shape of said magnetic tile is selected from a group consisting of a triangular shape, a square shape, a rectangular shape, a rhombic shape, a circular shape, an elliptical shape, a polygonal shape, an odd shape, an irregular shape, and combinations thereof.

16. The magnetic tile of claim 12, wherein a surface of said parchment has at least one inscription, and wherein said inscription is selected from a group consisting of a design, an indicia, a drawing, a photograph, a scenery, a picture, an illustration, a gesture, a smiley-type face, a phrase, a statement, a rhyme, an alphabet, a numeral, a symbol, a visual message, a graphic image, a verbiage, and combinations thereof.

17. The magnetic tile of claim 12, wherein at least one plug is inserted inside said at least one opening to secure said at least one magnetic material.

18. The magnetic tile of claim 12, wherein said magnetic tile is magnetically and removeably secured to at least one panel.

19. The magnetic tile of claim 12, wherein material of one of said first barrier material layer and said second barrier material layer is selected from a group consisting of a non-magnetic material, paper, cardboard, a cellulose material, a non-magnetic rigid material, a non-magnetic rigid laminate, a non-magnetic rigid fibrous material, a non-magnetic rigid composite material, and combinations thereof.

20. The magnetic tile of claim 1, wherein said at least one non-magnetic material tile having at least one opening, and wherein at least one plug is inserted inside said at least one opening to secure said at least one magnetic material.

21. The magnetic tile of claim 6, wherein said at least one non-magnetic material tile having at least one opening, and wherein at least one plug is inserted inside said at least one opening to secure said at least one magnetic material.

* * * * *